Aug. 21, 1945.    V. E. PRATT    2,383,161
FOCUSING MEANS FOR CAMERAS
Original Filed Jan. 3, 1942    4 Sheets-Sheet 1

INVENTOR
VERNEUR E. PRATT.
BY
Van Deventer + Grist
ATTORNEYS

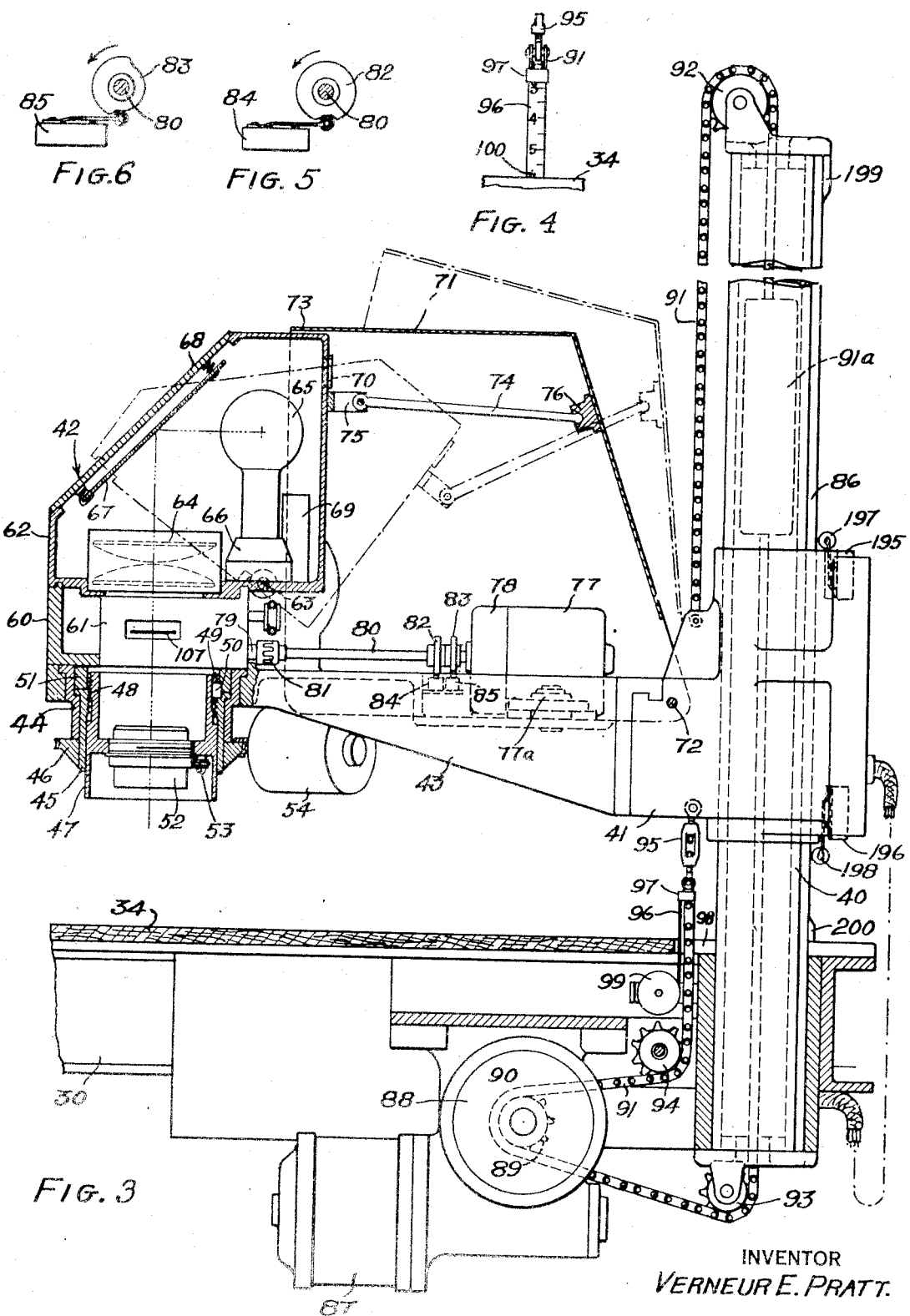

Aug. 21, 1945.                    V. E. PRATT                    2,383,161
                           FOCUSING MEANS FOR CAMERAS
                    Original Filed Jan. 3, 1942      4 Sheets-Sheet 3
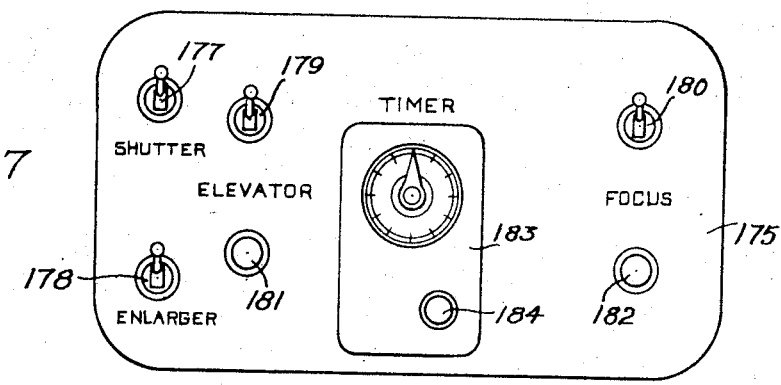
FIG. 7
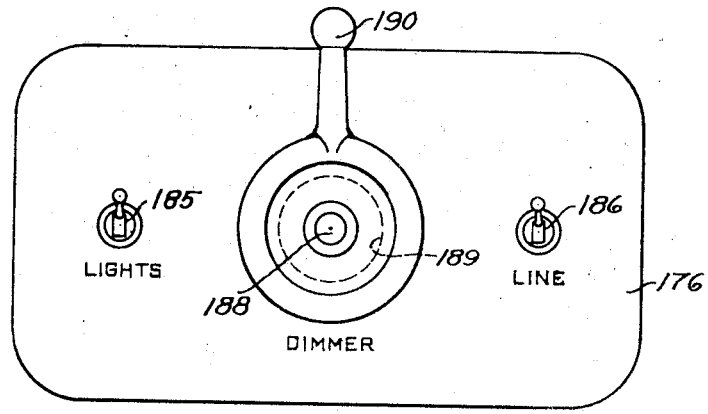
FIG. 8
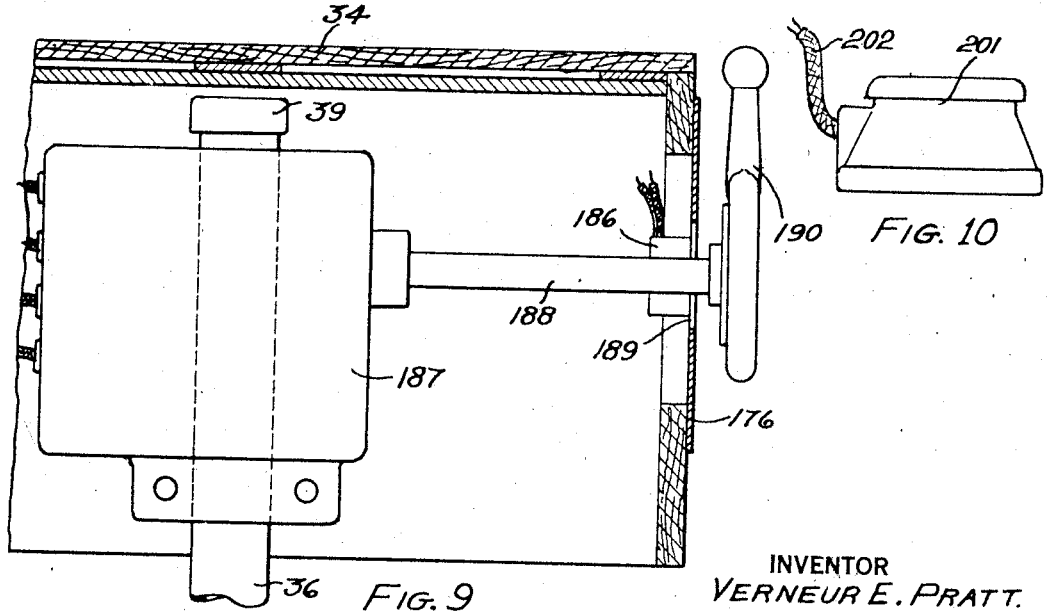
INVENTOR
VERNEUR E. PRATT.
BY
Van Deventer & Grier
ATTORNEYS

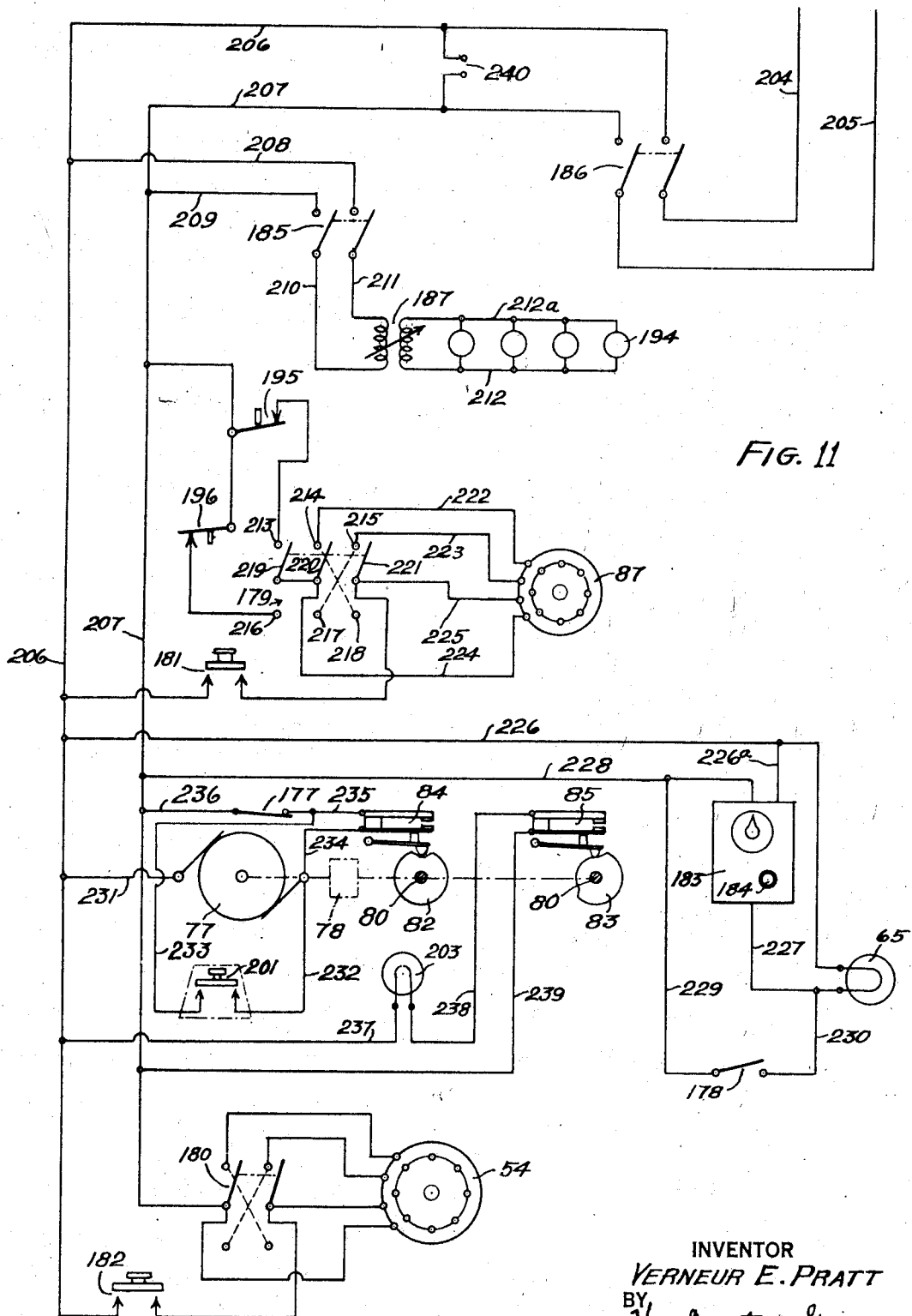

Patented Aug. 21, 1945

2,383,161

UNITED STATES PATENT OFFICE 2,383,161

FOCUSING MEANS FOR CAMERAS

Verneur E. Pratt, Norwalk, Conn., assignor to Microstat Corporation, a corporation of Delaware Original application January 3, 1942, Serial No. 425,528. Divided and this application July 1, 1943, Serial No. 493,036

4 Claims. (Cl. 95—44)

The present invention pertains to improvements in focusing means for cameras.

This application is a division of copending application Serial No. 425,528, filed January 3, 1942, now Patent No. 2,369,247, of February 13, 1945. The principal object of the invention is the provision, in a camera, for recording drawings, maps, documents and the like on photographic film such as microfilm, of a lens controlled by a reversible motor through positive speed reducing means, to a rotary focusing means on said lens and a counter positively operable by said motor, said counter having visual characters indicating predetermined increments of movement of said lens. Another object of the invention is the provision of a camera having a lens moved therein on the line of the optical axis, rotary means to move the lens on said line and motor means controlled from a point spaced apart from said lens for moving the lens toward or away from its focal plane in said camera, and means positively connected to said motor and carrying visual characters indicating increments of movement of said lens regardless of which direction it is moved along said axis.

Other objects and advantages of the invention will become evident during the course of the following description, in connection with the accompanying drawings, in which—

Figure 3 is a vertical side view of the camera-projector and related apparatus partly in section;

Figure 4 is a detail view of the elevation indicating scale;

Figure 5 is a detail view of the exposure motor holding switch and cam;

Figure 6 is a similar view of the cam and switch for controlling open shutter warning light during picture taking;

Figure 7 is a detail view of the main operational control panel and apparatus;

Figure 8 is a similar view of the main switching and illumination control panel;

Figure 9 is a sectional detail view showing the disposal of the illumination control means;

Figure 10 illustrates the foot-switch for tripping the exposure motor; and

Figure 11 is a wiring diagram of the various electrical apparatus embodied in the invention.

Figure 1:
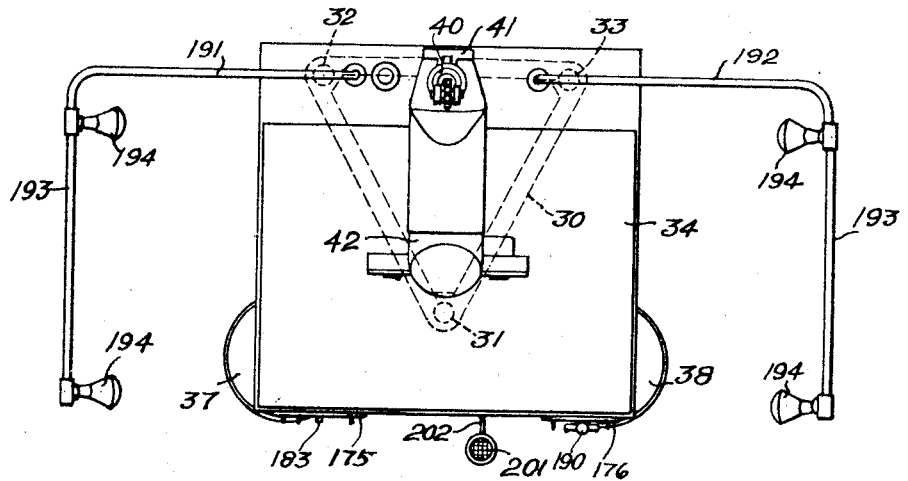
Figure 1 is a plan view of the apparatus.

Referring to Figure 1, a stiff triangular frame 30, preferably of welded steel construction, is mounted on supporting legs 31, 32 and 33. A platen or table 34 is adjustably secured to the top of the frame 30. Two auxiliary supporting columns, provided with heavy bases 37 and 38, are disposed under the front corners of the table 34. Suitable clearance is normally provided between the upper ends 39 of these columns and the table as shown in Figure 9.

Rigidly secured in the rear of the frame 30 is a vertical tubular column 40 on which is slidably mounted a bracket or carriage 41. The bracket 41 carries a unitary camera-projector generally denoted by the numeral 42, the unit being shown in enlarged perspective in Figure 2, and in detail longitudinal partial section in Figure 3.

Referring to Figure 3, the camera-projector 42 has a main base or bed plate 43. A stepped vertical sleeve 44 is secured in the front end of the base 43 and has rotatably mounted therein, a second sleeve 45 on the lower end of which is secured a worm-gear ring 46. A cylindrical lens barrel 47 is threaded at 48 inside the second sleeve 45, and has a longitudinal slot 49 engaging a suitable key 50 in a stationary ring 51 secured in the upper end of the outer sleeve 44. A suitable lens assembly 52, having a lever 53 for adjustment of the usual iris diaphragm (not shown), is mounted in the barrel 47.

Figure 2:
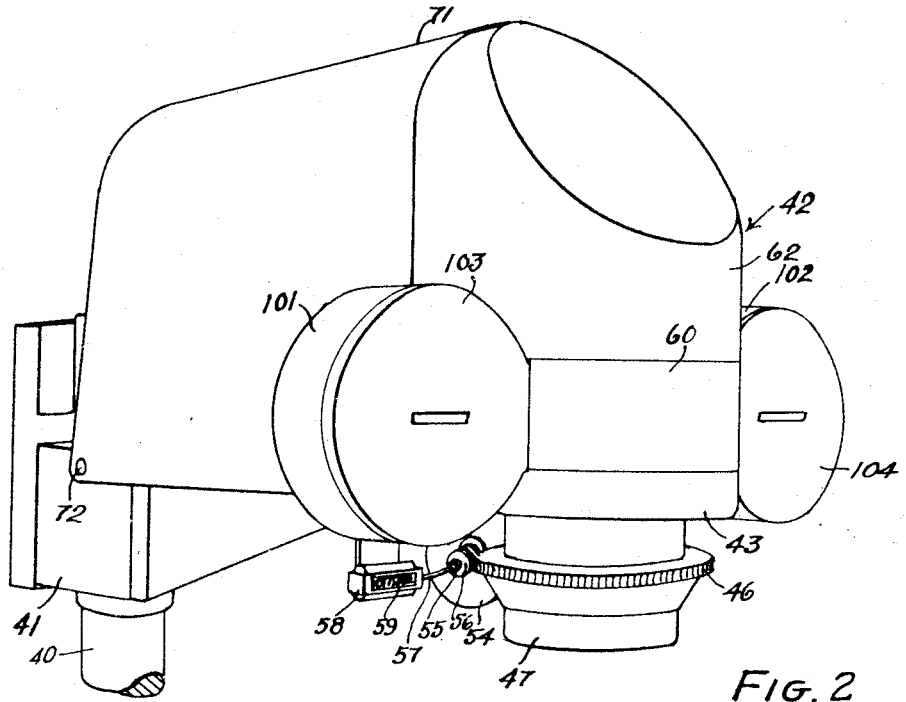
Figure 2 is a perspective detail view of the camera-projector and its mounting.

A reversible motor 54, mounted on the bottom of the camera base 43, has on its shaft 55 a worm 56 meshing with the gear ring 46 as shown in Figure 2. A flexible shaft 57 connects the end of the motor shaft 55 to a revolution counter 58 so disposed that its counter numerals 59 are in direct view from the front of the apparatus.

From the foregoing description it will be evident that when the motor 54 is operated the worm 56 revolves the gear ring 46 and with it the sleeve 45. The barrel 47 being threaded in sleeve 45 but restrained from rotation by the stationary key 50, rotation of sleeve 45 feeds the barrel 47 and with it the lens assembly 52 upward or downward depending on the direction of rotation of the motor 54. Thus the motor 54 is adapted to adjust the focus of the lens assembly 52, each revolution of the motor changing the lens position by a definite small increment predetermined by the lead of the thread 48 and the reducing ratio of the worm 56 and gear 46; for example, an increment of .00025 inch. As each revolution of the motor, and consequent increment of focusing movement, is plainly registered by the counter 58, the setting of the latter's numerals 59 at any time presents an exact indication of the lens position, so that by control of the motor 54 any given lens position may be accurately made or reproduced, the comparatively large numerals 59 being plainly visible at a distance from the device.

A lamp housing 62 is horizontally pivoted at 63 and normally engages the top of the central portion 60 in light-tight relationship. A condensing lens system 64 is secured in the bottom of the housing 62 in optical alignment with the projection or photographic lens 52. A lamp 65 is mounted in a socket 66 in the rear end of the housing 62. An inclined mirror 67 is adjustably secured to the upper front wall 68 of the housing in position to direct light from the lamp 65 to the condensing lens system 64, thence through the sub-assembly 61 and projection lens 52. Ventilation for the lamp 65 is provided by a pipe 69 leading up through the bottom of the housing 62 and suitable openings 70 in the rear thereof.

A light shield or hood 71 is pivoted at 72 to the carriage 41, the front upper end 73 of the hood normally overlying the rear top of the lamp housing 62. A rod 74 is horizontally pivoted at 75 to the rear of the housing 62, while the rear end of the rod engages a socket 76 secured to the back of the hood 71.

When the housing 62 is swung upward and rearwardly on its pivots 63 to allow access to the sub-assembly 61 as hereinafter set forth, the rod 74 swings the hood 71 upwardly as illustrated in dot and dash lines, Figure 3, thus providing ample clearance between the top of the housing and the hood.

A motor 77 having a suitable speed-reducing-gear head 78 is mounted in the base 43 and is adapted to drive the shaft 79 of the sub-assembly 61 through an extension shaft 80 and a jaw coupling 81. The extension shaft 80 carries two cams 82 and 83, shown in detail in Figures 5 and 6, these cams being adapted to respectively control switches 84 and 85 for purposes hereinafter set forth. Rubber vibration dampers 77ª are provided in the mounting of motor 77.

The column 40 is provided with a longitudinal key 86 fitting in the rear portion of the carriage 41, thereby preventing any swinging motion of the carriage and camera-projector about the column.

A reversible motor 87, mounted under the frame 30, is provided with a worm-gear speed reducer 88 carrying on its output shaft 89 a sprocket 90. A roller chain 91 is secured to the upper portion of the carriage 41 and extends upward therefrom and over an idler sprocket 92 on the top of the column 40, thence downward through the interior of the column and around a second idler sprocket 93 to the drive sprocket 90, and thence via a third idler sprocket 94 to a turn-buckle 95 secured to the bottom of the carriage 41.

When the motor 87 is operated to drive the chain 91 the carriage and camera-projector assembly is raised or lowered along the column 40, and as the worm speed reducer 88 is of the irreversible drive type the latter acts as a lock to hold the carriage at any point of elevation when the motor is stopped. The turn-buckle 95 is operable to take up any slack in the chain. A heavy weight 91ª is secured to the chain 91 inside the column 40 to serve as a counter-balance for the greater part of the weight of the carriage and camera-projector.

A measuring tape 96 has its free end clipped to the chain 91 at 97 just below the turn-buckle 95, the tape extending downward in front of the chain through a slot 98 in the table 34 and to a spring actuated retracting reel 99 of any suitable type secured under the table.

As the mechanisms of such reels are well known and form per se no part of the present invention, no further description is required herein. It is evident, however, that as the carriage is moved up or down the tape 96 unreels or re-reels through the slot 98 and the figures 100 (see also Figure 4) thereon serve as a visual indication of the height of the camera-projector above the table 34 as illustrated in Figure 4.

A pair of film housings or magazines 101 and 102 (Figure 2) are attached respectively to the left and right sides of the middle portion 60 of the camera-projector 42. The magazines 101 and 102 are provided with detachable front closures 103 and 104, and contain suitable film reels adapted to carry a film 107 threaded between them through the control and shutter sub-assembly 61.

Referring to Figure 1, the table skirt 174 carries on its front face left-hand and right-hand control panels 175 and 176 respectively, these panels being shown in enlarged detail in Figures 7 and 8.

The panel 175 has mounted therein two single-pole single-throw toggle switches 177 and 178 two reversing switches 179 and 180, two momentary contact push-button switches 181 and 182, and a time-switch 183 of any suitable type provided with a trip or release button 184.

The panel 176 has mounted thereon two toggle switches 185 and 186. Mounted on the post or standard 36 behind the panel 176 is a variable voltage transformer 187 having a rotary control shaft 188. The shaft 188 extends outward through an enlarged hole 189 in the panel 176 so as not to touch the latter, and is provided with an operating handle 190 in front of the panel.

Referring to Figure 1, a pair of brackets 191 and 192, secured to the rear portion of the frame 30 and extending angularly outward and upward therefrom, have forwardly-extending horizontal portions 193, each carrying a plurality of incandescent lights 194. The lights 194 are directed downwardly and inwardly so as to provide even illumination throughout the entire upper area of the table 34, while at the same time the angles of illumination are such that no direct reflection of light can enter the lens of the camera 42.

A pair of normally closed limit switches 195 and 196 (Figure 3) are mounted in the rear portion of the carriage 41. These switches, which are preferably of the type known as micro-switches, are provided with operating lever rollers 197 and 198 adapted to engage and be actuated by abutments 199 and 200 respectively secured to the upper and lower rear extremities of the column key 86.

A momentary contact foot switch 201 (Figures 1, and 10) is movably disposed under the table 34 and is provided with a flexible cable 202 connecting it to the main apparatus in the electrical manner hereinafter explained in connection with the wiring diagram (Figure 11). A small signal light 203, preferably equipped with a red bulb, is mounted at the rear of the table 34.

Referring to the typical wiring diagram (Figure 11), the numerals 204 and 205 designate the conductors of a suitable source of A.-C. current supply, leading into the main or line switch 186, thence to distributing conductors 206 and 207.

Branches 208 and 209 lead to manual switch 185 hereinafter termed the light switch. From the output poles of the switch 185 wires 210 and 211 are connected to the variable transformer 187. The lamps 194 (Figure 1) are connected in parallel between conductors 212 and 212ᵃ from the output terminals of the transformer 187.

It will be seen from the above description that when the switches 186 and 187 are closed, the lamps 194 draw current and are illuminated, the voltage and consequently the intensity of the illumination being adjustable by means of the variable transformer 187.

The reversing switch 179 is of the three-pole double throw construction with a central "off" position. The switch has upper and lower contact points 213, 214, 215 and 216, 217, 218, respectively adapted to be alternately engaged by poles 219, 220 and 221, poles 219 and 220 being electrically joined together. Contacts 214 and 215 are respectively cross connected in the usual manner with contacts 217 and 218 for reversing the current direction through field connectors 222 and 223 leading to the elevating motor 87. Poles 220 and 221 have leads 224 and 225 comprising armature connections to the motor 87. Pole 221 is also connected via the normally open push-button switch 181 with the distributing conductor 206. Poles 213 and 216 are connected to the second conductor 207 respectively via the normally closed limit switches 195 and 196.

When the switch 179 is thrown to upper position and the push-button switch 181 is closed, the connection from conductor 206 is completed via switch 181, pole 221, to the motor armature lead 225, also via pole 221 and contact 215 to the field lead 223. At the same time current flows from the conductor 207 via limit switch 195, contact 213 and pole 219 to the pole 220, thence to the second armature lead 224, and via contact 214 to the second field lead 222. By this means the motor is energized to raise the carriage 41 (Figure 3).

When the switch 179 is thrown to downward position, the current connections to the armature leads 224 and 225 are the same as described except that the pole 219 receives current from conductor 207 via limit switch 196 and lower contact 216 without any change in polarity. However, the field leads 222 and 223 now receive their current from poles 221 and 220 respectively through the cross connected contacts 218 and 217 respectively. The motor field is thereby reversed, causing the motor 87 to revolve in the reverse direction and lower the carriage 41.

If during upward driving operation of the motor 87 the limit switch 195 is opened, the described supply from conductor 207 is broken, causing the motor 87 to stop. Thereafter, current can be restored only by throwing the switch downward to complete the connection through the second or lower limit switch 196, whereupon closure of the button switch 181 again energizes the motor in the downward driving direction.

Similarly, if the lower limit 196 switch is opened to stop the motor, the latter can only be energized after throwing the switch 179 to upward driving position.

By the above described means, it will be seen that engagement of either limit switch with its operating abutment 199 or 200 stops the progress of the carriage 41, but the latter may be thereafter moved away from the extreme or limit position after reversing the switch 179.

Returning to Figure 11, a branch lead 226 connects one side of the projection lamp 65 with the distributing conductor, while the other side of the lamp is adapted to be connected via a lead 227, the time switch 183, and a second lead 228 to the second distributing conductor 207. The manual switch 178 (Figure 7) is shunted across the time switch 183 by means of wires 229 and 230. Thus when switch 178 is closed, the lamp 65 remains energized irrespective of the time switch 183.

The time switch 183 is preferably of the well-known electrically actuated type, a branch 226ᵃ being provided to supply a current connection from 206 to the actuating mechanism under control of the button 184. The shutter motor 77 is connected on one side via a lead 231 to the conductor 206. A wire 234, from the second side of the motor 77, is connected to the normally open cam switch 84 (Figures 3 and 5) thence via lead 235, the toggle switch 177 (Figure 7), and a lead 236 to the conductor 207. Also, from the other or second side of the motor 77, a wire 232 is connected to the normally open foot switch 201, which latter is in turn connected via lead 233 to the lead 235.

From the above connections, it is evident that the motor 77 may be energized through either one of two parallel circuit-closing means—that is via the foot-switch 201 or via the cam switch 84 and manual switch 177, which latter is normally kept closed during the photographing operation. The cam 82, as previously set forth, is secured on the low-speed geared output shaft 80 of the motor 77. The contour of the cam 82 is such that it allows the switch 84 to remain open only in normal or stop position as shown.

When the foot-switch 201 is momentarily closed to start the motor 77, the initial movement of the cam 82 also closes the switch 84 and holds it closed after opening of the foot switch, thus keeping the motor energized and causing it to drive the shaft 80 throughout one complete revolution, whereupon the cam 82 again allows the switch 84 to break the circuit and stop the motor 77.

If the toggle switch 177 is opened, as in projection operations hereinafter described, it is evident that no holding circuit can be established by the cam switch 84, and the motor 77 remains solely under control of the switch 177.

The second cam-switch 85 (Figures 3 and 6) is connected in series with the signal lamp 203 across the conductors 206 and 207 via wires 237, 238 and 239 (Figure 11). The cam 83, also mounted on the shaft 80 as previously set forth, is of such contour as to close the switch 85 and thereby cause the signal light 203 to light up during that portion of the revolution of shaft 80 when the previously described shutter 168 is open.

The focusing motor 54 is connected through the reversing switch 180 with the conductors 206 and 207, the normally open push-button switch 182 being interposed in the circuit connection from conductor 206. As the operation and wiring of such reversing switches are well known and have previously been described in connection with elevating motor 87, further detailed description thereof is believed unnecessary repetition herein; it is evident that throwing the switch 180 to upper or lower position conditions the motor circuit for operation of the motor in either desired direction under control of the push-button switch 182.

The operation is as follows:

*Photography*

When it is desired to record images of documents, maps, drawings, or the like, the operator first places a frame of developed film 107 in position on the film-gate, the housing 62 having been previously swung upward and open on its pivots 63 to allow access to the interior of the sub-assembly 61. The housing 62 is closed down, and the "enlarger" switch 178 is closed, thereby turning on the projection lamp 65. The operator next depresses the foot-switch 201, starting the shutter control motor 77 and allowing the latter to run under control of the cam-switch 84 until the shutter reaches wide-open position. At this point the manual switch 177 is opened to stop the motor 77, leaving the shutter in open position.

The shutter 168 being open, light passes from the lamp 65 to the inclined mirror 67, thence downward through the condensing lens system 64, the shutter sub-assembly 61 and the film therein, and the lens 52, an image of the developed film frame being projected on the table 34 or on a sheet of material spread thereon. The operator then manipulates the elevator switch 179 and push-button 181 to lower or raise the carriage and camera-projector by means of the motor 87 until the projected image covers the desired area. The operator similarly manipulates the switches 188 and 182, to adjust the lens 52 by means of the focusing motor 54 until the image is sharply focused. The foregoing field and focus adjustments may be made with the image projected directly on the sheet to be photographed or on a suitable blank sheet of proper size.

The document, drawing, or the like having been secured to the table 34 by any suitable means such as tacks, tape, or weighted retainers, and the previously described field and focus adjustments having been made, the lamp 65 is extinguished by opening the switch 178 and the shutter switch 177 is closed, the latter causing the motor 77 to be energized through the cam-switch 84 as previously described. The motor 77 runs until the cam 82 opens the switch 84 in normal position as shown in Figure 5, thereby closing the shutter. The operator replaces the developed film with unexposed film, threading the latter from the reel 105, through the control sub-assembly 61, as shown in Figures 9 and 10, and to the take-up reel 106; the housing 62 is again lowered into closed position to exclude light.

It will be understood the above described preparatory field and focus setting need be performed only once, at the beginning of a series of photographic recordings of similar size.

To photograph the document spread on the table 34 the lights 194 are turned on by closing the switch 185 and if required the intensity of illumination is adjusted by means of the variable transformer 187, either to a pre-determined setting of the handle 190 or by use of any suitable light meter. The operator then momentarily closes the foot-switch 201 to start the shutter motor 77, the cam-switch 84 thereafter causing the motor to drive the shaft 80 until one complete revolution is completed as previously set forth.

During the single revolution noted, the notch or opening of the shutter traverses the optical path between the lens 52 and the film 107, allowing the lens to cast an illuminated image of the document on the film during a pre-determined length of time to effect the exposure. During the remainder of the revolution of shaft 80 after closure of the shutter, the film is advanced one frame. The single revolution of the shaft 80, Figure 3, thus effects the exposure and conditions the apparatus for the next exposure. The operator removes the first document or other subject photographed from the table 34, places the second in the same position, and again depresses the foot-switch 201 to photograph the second subject, and proceeds in the manner described to record the desired series of subjects on successive frames of the film 107.

As noted previously, an entire series of subjects may be photographed after a single initial setting of the field and focus. However, once a certain desired field and focus setting have been arrived at for a given size of subject, no initial projection is necessary thereafter in order to arrive at this setting for later recordings, due to the provision of the height scale 96, Figures 3 and 4, and the counter or register 58, Figure 2. When the operator has initially arrived at the proper field and focal settings as described, he may observe and note down the readings of the scale 96 and counter 58, the figures of both being readily visible from the operating position in front of the table. Thereafter, when it is desired to photograph further subjects of the size or series noted, or to reproduce the subjects by projection as hereinafter described, it is only necessary to operate the elevating and focusing switching means until the previously noted height and focal readings appear on the scale 96 and counter 59. Similarly, subjects of different areas may be photographed in series without intermediate test setting or focusing, simply by manipulating the elevating and focusing controls to bring the scale and counter readings to previously determined proper figures for the various sized subjects. In case of series photographing of widely differing fields or areas, and consequent lens distance, it may also be desirable to vary the intensity of the illumination by manipulation of the transformer control handle 190 as previously described.

It will be noted that all the foregoing operations may be effected by the user from a single position in front of table 34, the normal functions of setting camera height, setting the focus, setting the illumination, making the exposure, and resetting the film being carried out by remote control from the panels 175 and 176. Even the manual operation of changing or adjusting the film 107 in the camera may be carried out from the same position, since the camera may be lowered to extreme bottom position directly in front of the operator, the proper original height being afterward restored, as previously noted, from the scale 96. It is obvious that provision of the described complete remote control from a single position adapts the device to rapid and easy operation with a minimum of fatigue for the user.

*Reproduction*

When it is desired to reproduce previously photographed subjects, the developed film carrying the images is threaded into the camera-projector 42. The projection lamp 65 is turned on, the shutter is again opened by manipulation of switches 177 and 201, and the proper camera height and focus are arrived at either by direct test projection on a blank sheet on the table 34 or by setting to height and focal indicating figures previously noted at the time of photographing the particular subject to be reproduced. The time switch 183 having been set for the desired period of exposure, the switch 178 is opened to extinguish the lamp 65 and a suitable sheet of sensitized paper or the like is secured in proper position on the table 34.

The time switch 183 is tripped by means of its button 184, the switch closing and remaining closed for the predetermined time in the usual manner of such switches. The lamp 65 is thereby illuminated during the pre-determined period, during which period the enlarged image from the film 107 is projected on the sensitized sheet. When the time-switch 183 has again extinguished the lamp 65 the sensitized sheet is removed for development and/or fixing in the usual manner. In case a succeeding image on the film strip is to be reproduced, switches 177 and 201 are operated until the shutter motor 77 has closed and again reopened the shutter 168, during which operation the film has been advanced one frame in the manner previously described, after which a second sensitized sheet is placed in position and the second projection exposure made as set forth.

In case it is desired to make more than one print from the same film frame, the operator simply changes the sensitized sheets and effects the exposures by repeated trippings of the time switch 183 without intermediate closings of the shutter 168.

All the described reproducing operations are carried out from the single operating position, and except of course for changing the sensitized paper, all are done by remote control, with the same advantages of speed, ease and precision noted with respect to recording.

While the apparatus is adapted to reproduction in the precise original size, it is obvious that enlargement or reduction in the reproduction may readily be made by proper setting of camera-projector height and focus.

From the foregoing description it will be seen that the invention makes possible the photographic recording and reproduction with maximum rapidity, precision and accuracy, guesswork being eliminated. The accuracy is augmented by the fact that reproduction takes place by projection through the same lens and, if desired, with the identical setting used in the original photographic recording. Thus any defects, such as optical aberration or blurs impressed on the film for any reason, even such as slight optical defects in the lens, are automatically cancelled out and corrected by reversal in the projection through the same lens; the results are thus uniformly sharp reproductions of the originals.

A convenience outlet 240, connected to the conductors 206 and 207, Figure 11, may be provided at any suitable location on the device, for supplying current to any auxiliary electrical apparatus, such as extension lights or the like, which it may be desired to use in connection with the apparatus.

While the invention has been described in preferred form it is not limited to the precise structures illustrated, as various modifications and changes may be made without departing from the scope of the appended claims.

What is claimed is:

1. In a device of the character described, a casing, a lens in said casing and adapted to be moved therein on the line of the optical axis of said lens to focus the same, rotary means to move said lens on said line, a reversible motor, positive speed reducing means connecting said motor to said rotary focusing means, a counter spaced apart from said motor and said casing and having visual characters indicating predetermined increments of movement of said lens, and a flexible shaft connected to said motor and to said counter for positively operating the latter, said characters being visible outside the device.

2. In a device of the character described, in combination, a lens, means to move said lens to focus the same, said means including a reversible motor, a visual indicator spaced apart from said lens and said motor and directly connected to the latter by means of a flexible shaft, said visual indicator including numerical counter members cumulatively movable by said motor in definite digital increments, each incremental change in the indicating position of said visual indicator being a calibrated indication of a definite incremental movement of said lens, whereby said visual indicator may present a predetermined definite digital combination for each focal position of said lens.

3. In a camera-projector, a main horizontal base having a stepped vertical hole formed therein the center of which lies on the optical axis of said camera-projector, a stepped tubular boss mounted in said hole and secured to said base, a shouldered tube mounted in said tubular boss, a worm-gear ring secured to said shouldered tube, a cylindrical barrel mounted in said shouldered tube and having means associated therewith for causing said barrel to move longitudinally as said shouldered tube is rotated, a lens carried by said barrel, a reversible motor, a worm driven by said motor and connected to said worm gear ring, a counter carrying characters indicating increments of movement of said lens, and a flexible shaft having one end connected to said counter and the other end connected to said motor.

4. In a camera-projector, a main horizontal base forming a portion of the frame of said camera-projector and having a stepped vertical hole formed therein the center of which lies on the optical axis of said camera-projector, a stepped tubular boss in said hole and fixedly secured to said base, a shouldered tube mounted in said tubular boss and having its shoulder engaging the step in said tubular boss, a worm gear ring secured to said shouldered tube and movable therewith, a cylindrical barrel mounted in said shouldered tube and having means associated therewith for causing said barrel to move longitudinally as said worm-gear ring is rotated, a lens-cell secured to said barrel, a reversible electrical motor, said motor having a shaft extending therefrom, a worm secured to said shaft and meshed with said worm-gear ring, thereby driving the latter at a reduced rate of speed, a counter spaced apart from said frame and said motor, said counter having visual characters for indicating increments of movement of said lens cell, and a flexible shaft connected to said motor and to said counter thereby making it necessary for the axes of the motor and the counter to coincide.

VERNEUR E. PRATT.